US005687523A

United States Patent [19]
Stough

[11] Patent Number: 5,687,523
[45] Date of Patent: *Nov. 18, 1997

[54] DRYWALL TAPE

[75] Inventor: Ronald A. Stough, Hinsdale, Mont.

[73] Assignee: E-Z Taping System, Inc., Green Bay, Wis.

[*] Notice: The term of this patent shall not extend beyond the expiration date of Pat. No. 5,486,394.

[21] Appl. No.: 513,386

[22] Filed: Aug. 10, 1995

Related U.S. Application Data

[63] Continuation-in-part of Ser. No. 297,320, Aug. 26, 1994, Pat. No. 5,486,394.

[51] Int. Cl.[6] .................... B32B 3/10; E04B 2/00
[52] U.S. Cl. .................... 52/417; 52/479; 428/61; 428/110; 428/352; 428/354; 428/906
[58] Field of Search ............ 52/417, 420, 479; 428/61, 110, 343, 352, 354, 906

[56] References Cited

U.S. PATENT DOCUMENTS

| | | |
|---|---|---|
| 1,357,350 | 11/1920 | Schumacher . |
| 2,318,053 | 5/1943 | Brusse .................... 52/417 |
| 2,463,244 | 3/1949 | Carter . |
| 2,502,499 | 4/1950 | Ames . |
| 2,719,804 | 10/1955 | Carlson .................... 428/110 |
| 2,895,865 | 7/1959 | Humphner .................... 428/110 X |
| 3,109,207 | 11/1963 | Cooper .................... 52/417 X |
| 3,143,208 | 8/1964 | Sizemore, Jr. .................... 428/906 X |
| 3,575,771 | 4/1971 | Padgett . |
| 3,625,798 | 12/1971 | Ihti . |
| 3,671,372 | 6/1972 | Hoffman .................... 428/110 |
| 4,041,201 | 8/1977 | Würker . |
| 4,042,739 | 8/1977 | Emal et al. . |
| 4,313,991 | 2/1982 | Lamb . |
| 4,406,730 | 9/1983 | Altmix . |
| 4,421,808 | 12/1983 | Winkowski .................... 428/343 X |
| 4,652,331 | 3/1987 | Plasencia . |
| 4,707,202 | 11/1987 | Sweeny . |
| 4,750,968 | 6/1988 | Sweeny . |
| 4,757,783 | 7/1988 | Matheny . |
| 4,792,473 | 12/1988 | Vitale . |
| 4,835,925 | 6/1989 | Hoffman, Sr. . |
| 4,863,774 | 9/1989 | Tucker . |
| 4,913,766 | 4/1990 | Löjdström . |
| 4,977,718 | 12/1990 | Hoffman, Sr. . |
| 5,037,686 | 8/1991 | Conboy . |
| 5,198,300 | 3/1993 | Matthews et al. . |
| 5,246,775 | 9/1993 | Loscuito . |
| 5,401,557 | 3/1995 | Inomata et al. .................... 428/110 |
| 5,486,394 | 1/1996 | Stough .................... 428/61 |

FOREIGN PATENT DOCUMENTS 869952  5/1971  Canada .

Primary Examiner—Wynn E. Wood
Assistant Examiner—Laura A. Saladino
Attorney, Agent, or Firm—Lathrop & Clark

[57] ABSTRACT

To assist in rapid taping of seams between adjacent drywall units, a tape is provided in rolls. The tape has a first layer of flexible paper material with an inwardly facing pressure-sensitive adhesive coating thereon. A second layer of reinforcing woven fiber material overlies the first layer. A third layer of flexible material overlies the woven fiber material to encapsulate the fiber material between the first layer and the second layer. The third layer has an outwardly facing release coating such that the first layer adhesive will releasably engage the third layer for manual separation of the tape when rolled upon itself. The adhesive is formulated to maintain adhesion even when wetted by an overlying layer of drywall mud. Furthermore, the release coating on the third layer accepts and allows the adherence of drywall mud. The tape may be used in fire wall applications. Perforations may be provided in the tape to facilitate adhesion.

5 Claims, 2 Drawing Sheets

DRYWALL TAPE

This application is a continuation-in-part of application Ser. No. 08/297,320, filed Aug. 26, 1994, now U.S. Pat. No. 5,486,394.

FIELD OF THE INVENTION

The present invention relates to drywall installation materials in general, and to tape for overlying drywall seams in particular.

BACKGROUND OF THE INVENTION

In modern commercial and residential construction interior wall surfaces are typically formed from flat modular units affixed to wood or metal studs. These units, know as sheet rock, gypsum board, or generically herein as drywall, come in standard dimensions which are abutted to form a continuous surface. In order to present a surface which is unmarked by seams, it is necessary to position bridging tape which overlaps the seam and which supports a coating of a wet plaster-like compound known as mud. The mud is applied to obscure any variations in the wall profile, and to form the wall surface into an uninterrupted expanse.

Conventional drywall tape is typically a simple kraft paper strip which is adhered to the drywall surfaces by a coating of mud. Because the mud must be applied as the tape is positioned, operators must take care not to discharge the mud onto non-work surfaces. In addition, once the drywall tape has been applied an installer must wait as much as a day for the mud to dry before a final surface coat of mud can be applied.

Self-adhesive drywall tapes have been previously suggested. An open fiberglass mesh self-adhesive drywall joint tape has been used. However, to fill the large openings in this mesh, a joint compound must be applied to the mesh before the final mud coat. Other tapes have had molded plastic shapes, or have required a removable release backing strip which must be peeled away from the tape as it is applied, providing a complicating additional step to the taping operation.

What is needed is a tape for drywall installation which may be applied in a single step, without the need for removal of a release backing, and which permits immediate application of drywall mud.

SUMMARY OF THE INVENTION

The drywall tape of this invention is self-adhesive and is provided in rolls. The tape assists in rapid taping of seams between adjacent drywall units. The tape has a first layer of flexible paper material with an inwardly facing pressure-sensitive adhesive thereon which is adapted to adhere to the drywall material. A second layer of reinforcing woven fiber material overlies the first layer. A third layer of flexible material overlies the woven fiber material to encapsulate the fiber material between the first layer and the second layer. The third layer has an outwardly facing release coating such that the first layer adhesive will releasably engage the third layer for manual separation of the tape when rolled upon itself. A crease is formed along the center of the tape to facilitate positioning of the tape in a wall corner. The self-release properties of the tape allow it to be easily dispensed and applied without the need to remove a backing. The adhesive is formulated to maintain adhesion even when wetted by an overlying layer of drywall mud. Furthermore, the release coating on the third layer accepts and allows the adherence of drywall mud. Perforations may be provided in the tape to avoid underlying pockets of air and to permit moisture in the mud to pass through the tape to the drywall. The tape of this invention may also be applied in a single step in fire wall applications, where cosmetic appearance is not a concern.

It is an object of the present invention to provide a reinforced tape for application to drywall.

It is another object of the present invention to provide a tape for application to drywall which is self-adhesive and which does not require application of mud to adhere to the drywall.

It is a further object of the present invention to provide a paper tape for application to drywall which may be wound in rolls for releasable engagement with itself.

It is an additional object of the present invention to provide a tape for application in fire walls.

It is yet another object of the present invention to provide a tape for application to drywall having a pressure-sensitive adhesive which retains its adhesion when the tape is covered with drywall mud, and having an outwardly facing surface which retains mud thereon.

It is an additional object of the present invention to provide a drywall tape which is resistant to tearing.

Further objects, features and advantages of the invention will be apparent from the following detailed description when taken in conjunction with the accompanying drawings.

DESCRIPTION OF THE PREFERRED EMBODIMENT

Figure 1:
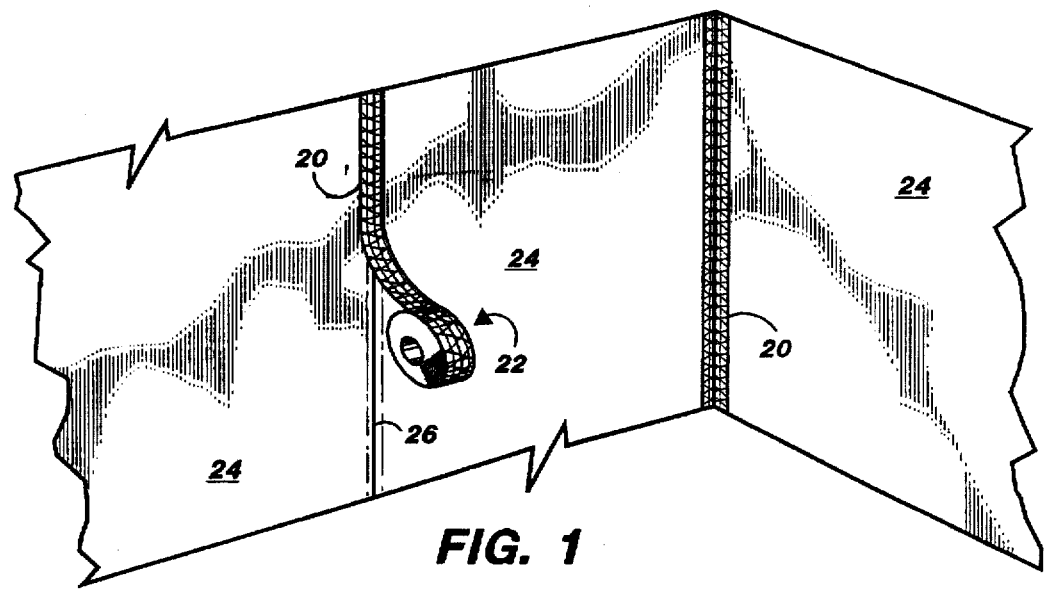
FIG. 1 is a pictorial view representing the tape of this invention being applied to a seam between adjacent sheets of drywall material.

Referring more particularly to FIGS. 1–4, wherein like numbers refer to similar parts, the drywall tape 20 of this invention is preferably coiled into rolls 22, as shown in FIG. 1. An interior surface suitable for painting or attachment of other wall covering is formed in a dwelling or other structure by first attaching drywall panels 24 to wall studs (not shown). Drywall panels 24 are typically provided in a limited assortment of fixed dimensions, for example four by eight feet. In order to form a wall surface of greater dimensions, a number of drywall panels 24 are affixed to the wall studs in adjacent relationship. The vertically or horizontally mounted drywall panels, which are usually formed of a stiff interior chalk-like material surrounded by a paper coating, present linear grooves or gaps at the seams 26 where the panels 24 abut. The seams 26, if left untreated, would present a visually unattractive pattern possibly visible through the final wall finish. To obscure the seams and to present the appearance of a continuous uninterrupted wall surface each seam 26 is bridged by a segment of the tape 20, which provides a means for bridging the seam between a first sheet of drywall and a second sheet of drywall.

A common prior art drywall tape was a simple sheet of kraft paper which was adhered to the drywall seam by an application of a gypsum compound or mud. This application of mud was typically messy, and required a period of time up to a day between application of the tape and application of the overall mud coat.

The tape 20 has a pressure-sensitive adhesive coating 28 which allows the tape 20 to be adhered to the drywall panels 24 without mud or activating liquid. The coating 28 provides a means for adhering the tape to two sheets of drywall in response to the application of pressure. The adhesive 28 is preferably an aqueous-base acrylic adhesive. The quantity of adhesive employed will determine the level of initial tack. An exemplary range of adhesive quantities is five to twelve pounds of adhesive per 3,000 square feet of product, with eight pounds representing a level which balances added adhesive cost with greater initial tack. Once the adhesive is formulated and applied to paper it should not be affected by being rewetted.

Figure 2:
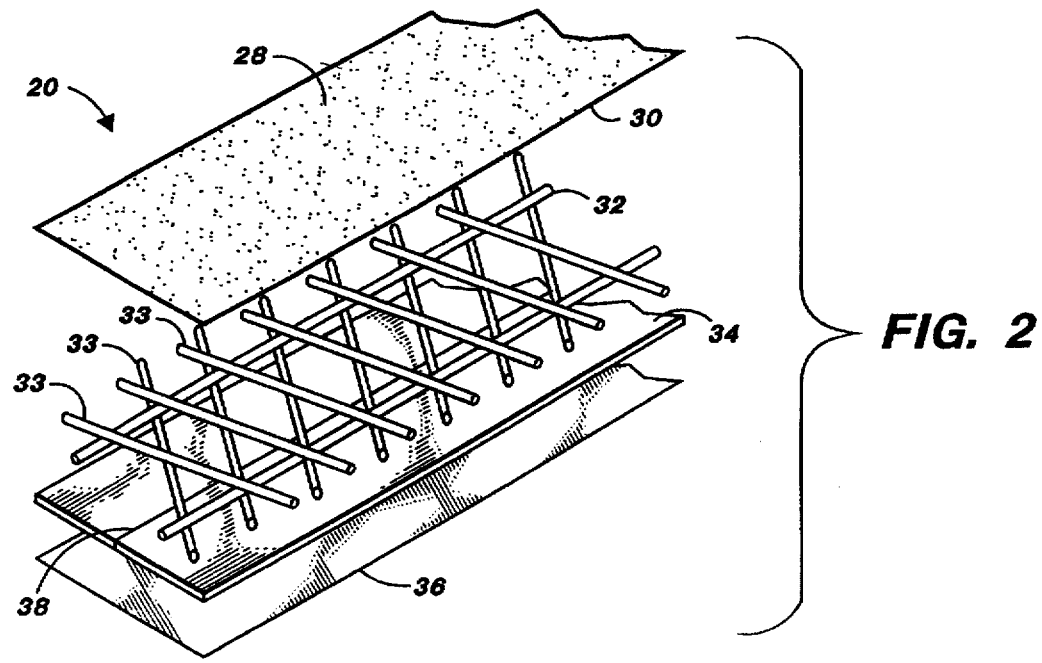
FIG. 2 is an exploded isometric view of the unified layers of the drywall tape of FIG. 1.

As shown in FIG. 2, the adhesive coating 28 is formed on a base layer 30 which is preferably 25–30 pound flat back paper. The base layer 30 is flexible, allowing the tape 20 to be coiled and uncoiled from the roll 22. The base layer is preferably a kraft paper. For reduced cost the base layer need not be a white paper, as its color will not detrimentally show through the top layer 34

A means for reinforcing the tape to resist tearing is provided by a web 32 of fiberglass multi-filamented strands 33 overlies the paper base layer 30. The strands may be arrayed in a diamond pattern as shown, or may be placed in a rectangular pattern or any other reinforcing array. The fiberglass strands may be those produced by Owens Corning or Pittsburgh Plate Glass Company.

In contrast to some strapping tapes which have strands on a film base running in an exclusively machine direction, the tape 20 has strands which also run in the cross-machine direction, giving the tape tear resistance. The cross direction strands may be 150 1/0 fiberglass strands. Typically, the strands running in the machine direction need not be so strong as the strands running in the cross-machine direction, because there are more strands running in the machine direction.

A top layer 34 is a flexible white paper which overlies the fiberglass web 32 and is permanently adhered to the base paper layer 30 by a hot melt amorphous polypropylene adhesive. The top layer is preferably 25–40 pound paper. The top layer may have a smooth surface, or alternatively it may have a roughened surface.

The tape 20 is manufactured in an automatic process in which the fiber glass strands extend in two patterns, an angled pattern in the cross direction and lengthwise in the machine direction. The sheet with the amorphous polypropylene comes from the bottom around a roll and engages the fiberglass and the top sheet between two rollers. The paper will generally be treated in widths of about 72 inches, and later cut down to tape roll size of approximately two inches width. The adhesive for attachment to the wall has not been applied to the base layer at the time of bonding the base layer to the top layer.

In order to prevent the adhesive coating 28 from forming a permanent bond to with the top layer 34 when the tape 20 is wound into a roll 22, a means for releasing adhesively attached adjoining layers of tape in the form of a release coating 36 is applied to the top layer 34. The release coating 36 is preferably formed of low density polyethylene, similar to the coating on freezer paper, and is extruded or coated onto the top layer 34. Although the release coating is shown schematically in FIG. 2 as a is separate unit, it should be noted that the release coating does not exist as a sheet other than as applied to the top layer 34.

Once the base layer 30 has been laminated to the top layer 34 with the strands 32 therebetween, the adhesive coating 28 is applied and the tape is cut to size and reeled on rolls.

The adhesive coating 28, the base layer 30, the web of strands 32, the top layer 34, and the release coating 36 are bonded to one another in a non-removable fashion to form a multilayer tape 20 which has the necessary attributes to serve for drywall purposes.

The release coating 36 also provides an acceptable adhesion surface for attachment of the drywall mud coating which overlies the tape and the drywall surfaces.

Figure 3:
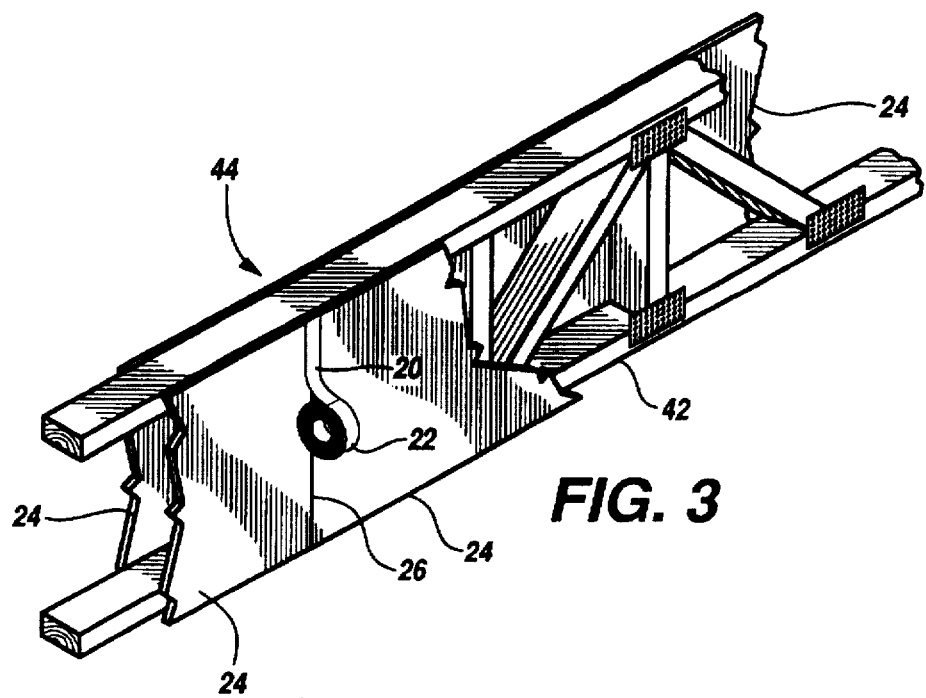
FIG. 3 is an isometric view of the tape of this invention being applied to a seam between adjacent sheets of drywall on a truss in a fire wall application.

In certain construction applications, drywall panels 24 are attached by fasteners to both faces of a supportive substructure such as a structural truss 42. Drywall in these applications helps to form a fire wall 44. Fire walls 44 are usually located in attics or in non-dwelling spaces of the building where the appearance of the drywall surface is not of concern. Prior art mudded paper tapes have commonly been used in fire wall applications. The typically tight quarters for attaching the drywall to form fire walls makes the use of mud for adhesive purposes even more cumbersome and unpleasant than usual. As shown in FIG. 3, the self-adhesive tape 20 of this invention may also be employed for construction of a fire wall. To construct a fire wall 44, drywall panels 24 are affixed to the truss 42 in a conventional manner, for example by nails. Drywall panels 24 are positioned on both faces of the truss 42 with the seams 26 between panels on one face of the truss staggered from the seams on the other face. The self-adhesive tape 24 is positioned over each seam 26 and pressed down to attach to the drywall panels 24 on either side of the seam. Because a smooth appearance is not called for in a fire wall, as it will generally not be viewed by the inhabitants, no finishing coat of mud is needed. In short, the entire fire wall construction process can take place with no mud whatsoever. Where increased fire burn time is required of the fire wall, a second layer of drywall panels is applied, with the seams staggered from those of the first layer. The tape 20 may also be used for taping the seams of the second layer of drywall.

Figure 4:
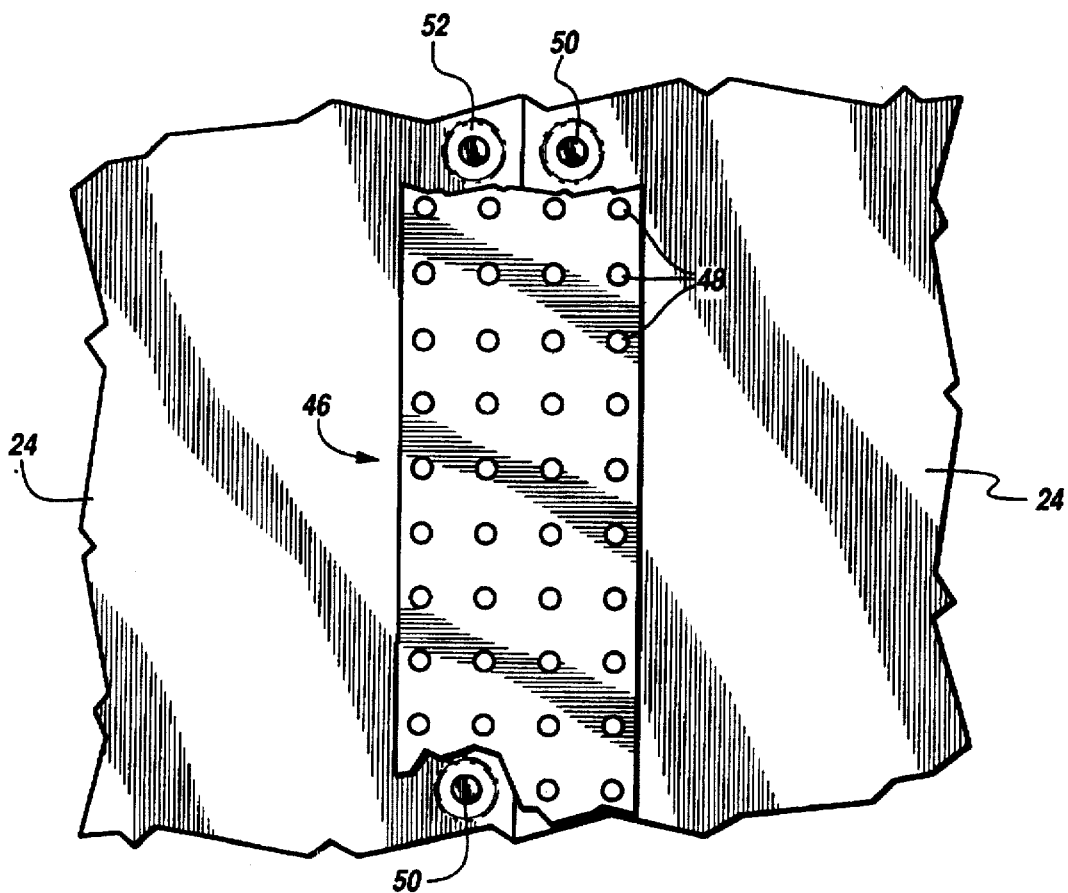
FIG. 4 is a fragmentary view of an alternative embodiment of the tape of this invention having a plurality of perforations and being applied to a seam between adjacent sheets of drywall material.

An alternative embodiment drywall tape 46 of this invention is shown in FIG. 4. The tape 46 is the self-adhesive tape 20 with an array of perforations 48 formed therein. The perforations 48 perform two functions. First, the perforations 48 allow air caught beneath the tape 46 in application to escape, thereby avoiding bubbles beneath the tape, or regions in which the tape 46 does not adhere to the drywall panel 24. Because drywall is commonly attached to stud walls by nails 50, slight dimples or depressions 52 are formed surrounding the nails. The perforations 48 not only make the tape more flexible to better extend into the depressions 52, but they allow the finish coat of mud to penetrate through the tape and fill most depressions. The perforations also allow the moisture contained in the mud to penetrate the tape and be absorbed in the drywall panels.

In a preferred embodiment, the perforations are approximately one-eighth of an inch in diameter, and are located on one-half inch centers, four across on a 58 mm wide tape.

The perforations may be formed in several ways. A roller may be provided with an array of protruding tack-like spikes which puncture the tape and form openings in the tape, with the punctured paper still retained to the tape in the form of a tiny flap. Alternatively, as in the tape shown in FIG. 4, the perforations may be formed by a repeat punch unit which die cuts the perforations, with a blower to remove the punched-out holes or chad.

Although the tape 20, 46 has been discussed in the context of wall-covering drywall panels, its application is equally suitable for ceiling-forming drywall panels.

It should be noted that although specific types of adhesives have been disclosed above, alternative adhesives having similar properties may also be employed where conditions or economic factors require.

It is understood that the invention is not limited to the particular embodiments disclosed and illustrated herein, but embraces such modified forms thereof as come within the scope of the following claims.

I claim:

1. A fire wall comprising:
   a) a supportive substructure;
   b) a first sheet of drywall fastened to the supportive substructure;
   b) a second sheet of drywall fastened to the supportive substructure adjacent to the first sheet to define a seam therebetween; and
   c) a strip of drywall tape affixed to the first sheet and the second sheet to bridge the seam, wherein the drywall tape has a pressure-sensitive adhesive which joins a first paper layer to the drywall sheets and an adhesive joins a second layer of paper to the first layer of paper with a reinforcing layer therebetween, and wherein the second layer of paper has a release layer thereon.

2. The fire wall of claim 1 wherein the reinforcing layer comprises a web of fiber strands between the first paper layer and the second layer of paper.

3. The fire wall of claim 1 wherein the reinforcing layer comprises a plurality of stands running in a first direction between the first paper layer and the second layer of paper and a plurality of strands running in a second direction different than the first direction.

4. A wallboard assembly comprising:
   a) a first sheet of drywall;
   b) a second sheet of drywall positioned adjacent to the first sheet to define a seam therebetween;
   c) a strip of drywall tape affixed to the first sheet and the second sheet to bridge the seam, wherein the drywall tape has a pressure-sensitive adhesive which joins a first paper layer to the drywall sheets and an adhesive joins a second layer of paper to the first layer of paper with a reinforcing web of fiber strands therebetween, wherein portions of the strip define a plurality of perforations which extend through the drywall tape; and
   d) a coating of mud which extends over the strip of drywall tape and extends through the perforations to contact the first sheet of drywall and the second sheet of drywall.

5. A wall comprising:
   a) a supportive substructure;
   b) a first sheet of drywall fastened to the supportive substructure;
   c) a second sheet of drywall fastened to the supportive substructure and positioned adjacent to the first sheet to define a seam therebetween; and
   d) a means for bridging the seam between the first sheet of drywall and the second sheet of drywall, wherein the seam bridging means has a means for adhering to the first sheet and the second sheet in response to the application of pressure, and a paper layer is connected to the means for adhering, and a means for releasing an adhesively attached tape is connected to the first paper layer and a means for reinforcing the tape is positioned between the means for adhering and the means for releasing.

* * * * *